(12) United States Patent
Cyliax et al.

(10) Patent No.: US 9,027,593 B2
(45) Date of Patent: May 12, 2015

(54) CHECK VALVE

(75) Inventors: Oliver Cyliax, Siegen (DE); Arthur Winterholler, Attendorn (DE)

(73) Assignee: Viega GmbH & Co. KG, Attendorn (DE)

( * ) Notice: Subject to any disclaimer, the term of this patent is extended or adjusted under 35 U.S.C. 154(b) by 791 days.

(21) Appl. No.: 13/295,503

(22) Filed: Nov. 14, 2011

(65) Prior Publication Data

US 2012/0132299 A1    May 31, 2012

(30) Foreign Application Priority Data

Nov. 15, 2010    (DE) .......................... 10 2010 051 156

(51) Int. Cl.
*F16K 15/03* (2006.01)
*F16K 27/02* (2006.01)

(52) U.S. Cl.
CPC ........... *F16K 15/033* (2013.01); *F16K 27/0227* (2013.01)

(58) Field of Classification Search
CPC ... F16K 15/03; F16K 15/033; F16K 37/0227; F16K 27/0227
USPC .............. 137/527, 527.2, 527.4, 527.6, 527.8
See application file for complete search history.

(56) References Cited

U.S. PATENT DOCUMENTS

| | | | | |
|---|---|---|---|---|
| 197,226 | A * | 11/1877 | Rodier ........................ | 137/527.2 |
| 305,722 | A * | 9/1884 | Tomlinson ................. | 137/527.2 |
| 345,420 | A * | 7/1886 | Eskholme ................... | 137/527.2 |
| 2,048,943 | A | 7/1936 | Munn | |
| 2,482,198 | A * | 9/1949 | Melichar ...................... | 137/527 |
| 2,748,788 | A * | 6/1956 | Duckstein ...................... | 137/527 |
| 2,923,317 | A * | 2/1960 | McInerney .................. | 137/527.2 |
| 3,366,137 | A | 1/1968 | Hansen | |
| 4,054,153 | A * | 10/1977 | Guyton ......................... | 137/527 |
| 4,842,014 | A * | 6/1989 | Strelow et al. ............. | 137/527.2 |
| 5,887,615 | A * | 3/1999 | Goto et al. .................. | 137/527.6 |
| 6,314,993 | B1 * | 11/2001 | Matthews et al. ............. | 137/527 |
| 6,679,290 | B2 * | 1/2004 | Matthews et al. ........... | 137/527.2 |
| 7,152,622 | B2 * | 12/2006 | Scaramucci et al. ........ | 137/527.2 |
| 8,490,648 | B2 * | 7/2013 | Scaramucci ............... | 137/527.2 |

FOREIGN PATENT DOCUMENTS

| | | |
|---|---|---|
| FR | 2067705 | 8/1971 |
| GB | 238052 | 8/1925 |
| WO | 2010/123889 A2 | 10/2010 |

OTHER PUBLICATIONS

Machine Translation from French to English of French Patent No. FR 2067705, as generated by European Patent Office Website's Machine Translator.

* cited by examiner

*Primary Examiner* — Craig Schneider
*Assistant Examiner* — Frederick D Soski
(74) *Attorney, Agent, or Firm* — Honigman Miller Schwartz and Cohn LLP

(57) ABSTRACT

The invention relates to a check valve for blocking a fluid-carrying line in case of reversal of the flow direction, containing a valve housing defining a flow path and having two connecting pieces and a valve seat therebetween, and a flap module mounted in the valve housing and containing a shut-off body interacting with the valve seat, a bearing device for pivotably supporting the shut-off body such that the latter is movable between an open position and a closed position, and a lever extending between the shut-off body and the bearing device and being connected to the shut-off body and the bearing device. For easier manufacturing, the invention proposes that a part of the flap module is formed by at least one sheet-metal shaped part.

19 Claims, 7 Drawing Sheets

CHECK VALVE

CROSS-REFERENCE TO RELATED APPLICATIONS

This application claims priority under 35 U.S.C. §119(e) to and benefit of German Application No. DE 10 2010 051 156.0-12, filed Nov. 15, 2010, which is incorporated herein by reference in its entirety.

TECHNICAL HELD OF THE INVENTION

The invention relates to a check valve for automatically blocking a fluid-carrying line in the event of a reversal of the flow direction, containing a valve housing, which defines a flow path and has two connecting pieces and a valve seat disposed therebetween, and a flap module, which is mounted in the valve housing and contains a shut-off body that interacts with the valve seat, a bearing device for pivotably supporting the shut-off body in the valve housing in such a way that the shut-off body is movable between an open position, in which the flow path is cleared, and a closed position, in which the shut-off body lies sealingly against the valve seat, and a lever, which extends between the shut-off body and the bearing device and is connected to the shut-off body and the bearing device.

BACKGROUND OF THE INVENTION

Check valves or non-return valves, which are the subject matter of the present invention, are used to preset the direction of flow of a fluid inside a pipe and to prevent the fluid being able to flow in the opposite direction to the specified one. If need be, i.e. in the event of a reversal of the flow direction (return stroke), the valve automatically prevents passage of the fluid, which may be a gas or a liquid.

The known check valves are constructed in accordance with the same basic principle, according to which namely a pivotably supported flap serves as a shut-off body, by means of which the throughflow opening surrounded by the valve seat may be closed in the event of undesirable return flow of the fluid. Check valves having a ball as a shut-off body (ball check valves) or a disk seated on a bolt as a shut-off body (disk check valves) are in principle prior art but are not the subject matter of the invention. The invention is limited to valves having a non-return flap as a shut-off body.

In the case of the latter, it is necessary in principle to distinguish between two types, namely on the one hand check valves, in which the flap is fastened to a lever that is guided by means of a shaft supported rotatably in the housing (swing check valve), and on the other hand check valves, in which the flap itself is guided by means of a shaft supported rotatably in the housing (wafer swing check valve).

The types, in which the flap is fastened to a lever that is guided by means of a shaft supported rotatably in the housing, are based on the physical operating principle of gravitational force, i.e. the overall effect of the torques produced as a result of the inertial forces of the flap module (lever, flap, add-on pieces) is that the flap in every intended installation position of the valve is pressed against the seat face or valve seat and the valve is closed. In this case, the closing function is assisted by the pressure difference that is produced in the line system by the pressure drop caused by the return flow of the fluid. For the total of all the torques to be oriented in the direction of the seat face, the axis of rotation of the shaft has to occupy a specific position and possess a minimum clearance relative to the seat face. As a result of this, the geometry of the lever is preset and defined. In the actual background art, the levers are cast in an L-shape and then cut. Manufacture is relatively complex and cost-intensive. A cast lever requires a minimum wall thickness, with the result that its mass and, by extension, the centre of gravity are disadvantageously shifted towards the axis of rotation. This shift has to be absorbed by means of additional compensating weights. This additionally increases the cost of the components. Furthermore, the cast levers are generally screw-connected to the shut-off body. For this type of connection, because of the mechanical loads of this type of check valve during operation, it is absolutely essential to introduce a screw locking device. This markedly increases the mounting outlay for the flap module.

In the other types of check valve, in which the flap itself is guided by means of a shaft supported rotatably in the housing, the axis of rotation lies level with the seat face or valve seat. By virtue of this arrangement, the generation of an adequate torque in the direction of the seat face for all installation positions between a horizontal and a vertical alignment is virtually ruled out. These types therefore use additional mechanical springs to press the flap in every intended installation position of the valve with adequate spring tension against the seat face and to close the valve. Here too, the closing function is assisted by the pressure difference that is produced in the line system by the pressure drop caused by the return flow of the medium.

The previously described types of check valve have several drawbacks. These include the fact that the shut-off bodies often project into the flow path and therefore have a negative influence on the flow behaviour. The mounting of the flap modules is also difficult because they have to be mounted in a relatively small space between two connecting pieces. If the valve itself is supported rotatably, a very precise alignment of the axis of rotation relative to the seat face is necessary, this in turn calls for very precise manufacturing tolerances and leads to correspondingly high manufacturing costs. In many types, it is also no longer a straightforward matter to exchange the shut-off body once the valve has been assembled. Finally, a serious drawback of the types, in which the flap module comprises a lever, is the complex construction of the flap module and the increased mounting outlay occasioned thereby.

The object of the present invention is therefore to provide a check valve that is easier to manufacture.

SUMMARY OF THE INVENTION

The previously derived and stated object is achieved according to a first teaching of the present invention in a check valve for automatically blocking a fluid-carrying line in the event of a reversal of the flow direction, containing a valve housing, which defines a flow path and has two connecting pieces and a valve seat disposed therebetween, and a flap module, which is mounted in the valve housing and contains a shut-off body that interacts with the valve seat, a bearing device for pivotably supporting the shut-off body in the valve housing in such a way that the shut-off body is movable between an open position, in which the flow path is cleared, and a closed position, in which the shut-off body lies sealingly against the valve seat, and a lever, which extends between the shut-off body and the bearing device and is connected to the shut-off body and the bearing device, in that at least one part of the flap module is formed by a sheet-metal shaped part. A corresponding sheet-metal shaped part may be manufactured in a simple manner by stamping and optionally subsequent bending. In this case, preferably all portions of the sheet-metal shaped part have the same wall thickness.

According to the invention it has been discovered that it is precisely by means of the flap module that the mounting outlay during assembly of a check valve may be reduced. The fact that a part of the flap module, in particular the bearing device and/or the lever, is formed by a sheet-metal shaped part, as will be described in more detail below, prevents components, which crucially guarantee tightness, having to be subjected to a separate re-machining operation, generally a cutting operation, in order to ensure as precise as possible an alignment of the shut-off body relative to the valve seat in the closed position. In addition to the considerable amount of time saved by eliminating a cutting re-machining operation, a further advantage is the markedly lower weight that a sheet-metal shaped part has compared to a casting, which has to have a minimum wall thickness that is greater than in the case of a sheet-metal shaped part. The lower weight of a sheet-metal shaped part arises precisely because with a component manufactured in such a way the wall thickness may be correspondingly smaller than with a casting, this in turn allowing smaller dimensions of the flap module and, by extension, of the entire check valve.

DETAILED DESCRIPTION OF THE INVENTION

As already previously indicated, in the check valve according to the invention in accordance with an embodiment the lever is formed by a sheet-metal shaped part. In this case, the lever is in particular connected as a separate component detachably to the shut-off body. A non-detachable connection, for example a welded, soldered or glued connection, is also conceivable. In principle an integral construction of lever and shut-off body is also conceivable. If the lever is a separate component and is at the same time a sheet-metal shaped part, then the lever may be connected by a detent connection in particular detachably to the shut-off body. In this case, the lever may comprise a recess, which interacts in a latching manner with a counterpart on the shut-off body that is introduced into the recess. The counterpart may be a mushroom-shaped detent element. By virtue of the lever being formed as a sheet-metal shaped part and hence having a particularly low wall thickness compared to a casting, the material of the lever, namely precisely the material around the recess, may be used for a latching connection, particularly if the counterpart on the shut-off body, because it is in this case for example a casting, does not yield. Thus, in the course of establishing the detent connection the material of the lever around the recess may be deformed, this being advantageous particularly if the shut-off body itself consists of a casting and so the counterpart perforce cannot be significantly deformed. Thus, by virtue of the lever consisting of a sheet-metal shaped part a particularly simple connection between lever and shut-off body is enabled for the first time. The detent function may be made even simpler if the recess is delimited by at least one material projection, preferably by a plurality of material projections. These material projections allow a particularly easy deformation of the material of the lever when the lever is moved over the counterpart, for example the mushroom-shaped detent element.

According to a further embodiment of the check valve according to the invention the bearing device is formed by a separate insert that is fixed in the valve housing. According to the invention, as a bearing device, instead of a shaft that is relatively complicated to fit a component is used, which on the one hand is easy to manufacture and on the other hand is particularly easy to mount and remove. This applies particularly in the situation where the insert, as will be described later, is a component that is insertable through an inspection opening. It is particularly advantageous if the insert, for fixing purposes, merely has to be clamped between two parts forming the valve housing, for example between a valve housing cover, which closes an inspection opening, and the remaining valve housing.

Such an insert may be formed likewise by a sheet-metal shaped part, with the result that the bearing device may be adapted particularly easily to the internal contour of the in particular cast housing. A sheet-metal shaped part moreover has a relatively low weight and, as previously indicated, given a suitable shape is also easy to insert into the valve housing.

In order that the insert may be inserted into the valve housing and fixed in a particularly simple manner, the valve housing may comprise at least one inwardly protruding projection, on which the insert, in particular the sheet-metal shaped part, is supported. Such a projection may for example consist of an inwardly oriented protrusion, which in one direction, for example in the direction of the top of the valve housing or the valve housing cover, forms a stop for the insert. A stop acting in the opposite direction may be formed for example by the valve housing cover, which is mounted onto the remaining valve housing as soon as the insert has been placed in the valve housing.

According to an embodiment the insert, in particular the sheet-metal shaped part, comprises a seating portion in the shape of a ring or ring portion, the external contour of which is preferably adapted to the internal contour of the valve housing. It is therefore possible for the insert in the fitted state to lie with its outer side fully against the inner wall of the valve housing. The seating portion may be formed in a simple manner by a curved sheet-metal strip, wherein the lateral leading edge of the sheet-metal strip is preferably supported on the inwardly protruding projection in the valve housing. The insert, in particular the sheet-metal shaped part, further comprises in particular a bearing portion having a preferably hook-shaped receiver for the lever. In this way, the insert may first be placed in the valve housing in a single operation by a fitter and then the lever may be hung on the preferably hook-shaped receiver. The bearing portion of the insert, as will be additionally described, may moreover comprise a further preferably hook-shaped receiver for a spring element. Such an insert may be realized in a particularly simple manner by a sheet-metal shaped part.

The previously described insert may comprise, in the case of a sheet-metal shaped part on its lateral leading edge supported on the inner housing projection, at least one projection that interacts with a corresponding indentation in the valve housing, in particular in the inwardly protruding projection of the valve housing that forms the stop for the insert. In principle, the insert may also have an indentation at an appropriate point and the valve housing may have a corresponding projection at an appropriate point. Such a projection and such an indentation, which interact with one another, make it possible to align the insert, i.e. bring it into the precisely defined position, in the valve housing in a particularly simple manner. At the same time, such a projection with a corresponding indentation represents an anti-rotation element that prevents an unintentional twisting of the insert, for example during screwing-on of a valve housing cover that simultaneously also forms the upper stop for the insert.

According to yet a further embodiment of the check valve according to the invention the flap module comprises a mechanical spring element, in particular a leg spring. Such a spring element may be used to preload the shut-off body via the lever in the direction of the valve seat, this being meaningful particularly if the lever is a flat plate-shaped component, the axis of rotation therefore lying level with the seat face. In the case of an L-shaped lever, such a spring element because of the geometry and the associated torques is not absolutely necessary but may nevertheless be used as an additional safety measure for tight closure. The already previously described bearing portion of the insert may, as stated, comprise a preferably hook-shaped receiver for such a spring element. During mounting, after the insert has been placed in the valve housing, not only the lever but also the spring element, for example the leg spring, may therefore be mounted easily in a single operation by the fitter. It is equally easy to remove the individual parts of the flap module.

As already indicated, it is advantageous if the valve housing has an inspection opening, which is closed by a valve housing cover, wherein the inspection opening is configured in particular in such a way, i.e. has such a size, shape and/or position, that in the open state it allows insertion and removal of shut-off body, bearing devices, in particular insert, lever and/or spring element. This is particularly easy if the receivers of the bearing portion are of a hook-shaped configuration, wherein the hook is opened in the direction of the inspection opening.

If a valve housing cover is present, it is as stated particularly advantageous if the insert, especially if the insert is a sheet-metal shaped part, is fixed by being clamped in between the valve housing cover and the remaining valve housing. The mounting of the flap module may therefore be effected by a particularly simple method in that first the insert is placed through the inspection opening onto the intended point in the valve housing, then the lever, which in particular has been connected by latching to the shut-off body, is fastened to the insert, being in particular hung on a hook-shaped receiver, and then the optionally provided spring element is likewise connected to the insert, being in particular inserted in a corresponding hook-shaped receiver. Finally, the inspection opening need merely be closed by the corresponding valve housing cover for the insert to be automatically clamped and the flap module to be held at the defined location.

According to yet a further embodiment of the check valve according to the invention the lever, as already described, comprises a recess, by which the lever is connected to the bearing device. Such a recess may in this case be fashioned in various ways, depending on the type of bearing device. It is therefore conceivable for the bearing device to be an insert having a preferably hook-shaped receiver for the lever, thereby dispensing with a shaft. For this purpose, the recess lies in particular in a plane that is parallel to or identical with the plane, in which lies the recess that interacts in a latching manner with the counterpart on the shut-off body. Preferably in this case the lever is a flat plate. In principle it is however also conceivable for the bearing device to comprise, instead of an insert, a shaft that extends at right angles to the longitudinal direction of the valve housing. In order to be able to connect an in particular L-shaped lever in this case to the shaft, the recess—a plurality of such recesses may alternatively be provided—for this purpose lies in a plane that extends at right angles to the plane, in which lies the recess that interacts in a latching manner with the counterpart on the shut-off body. Both alignments of the recesses may be achieved in a simple manner if the lever is a sheet-metal shaped part.

According to yet a further embodiment of the check valve according to the invention the shut-off body, in order to arrive in the open position, is movable fully out of the flow path. In this way, the flow is no longer significantly influenced and the flap module, which in particular comprises at least one sheet-metal shaped part, is also loaded as little as possible.

The object is further achieved according to a second teaching of the present invention in a check valve for automatically blocking a fluid-carrying line in the event of a reversal of the flow direction, in particular in a check valve such as has been described above, containing a valve housing, which defines a flow path and has two connecting pieces and a valve seat disposed therebetween, and a flap module, which is mounted in the valve housing and contains a shut-off body that interacts with the valve seat, a bearing device for pivotably supporting the shut-off body in the valve housing in such a way that the shut-off body is movable between an open position, in which the flow path is cleared, and a closed position, in which the shut-off body lies sealingly against the valve seat, and a lever, which extends between the shut-off body and the bearing device and is connected to the shut-off body and the bearing device, in that the bearing device is formed by a separate insert, i.e. not by a shaft, that is fixed in the valve housing, in particular is clamped between two parts forming the valve housing.

As has been explained in detail above, such an insert, which may be configured and disposed as described above and does not comprise a shaft, offers crucial advantages with regard to the mounting of the flap module and therefore markedly facilitates the manufacture of a corresponding check valve, particularly if according to an embodiment a part of the flap module, for example the insert and/or the lever, is formed by a sheet-metal shaped part.

In order that the insert may be inserted into the valve housing and fixed in a particularly simple manner, the valve housing may comprise at least one inwardly protruding projection, on which the insert, in particular the sheet-metal shaped part, is supported. Such a projection may for example consist of an inwardly oriented protrusion that in one direction, for example in the direction of the top of the valve housing or in the direction of the valve housing cover, forms a stop for the insert. A stop acting in the opposite direction may be formed for example by the valve housing cover, which is mounted onto the remaining valve housing as soon as the insert has been placed in the valve housing.

According to an embodiment the insert, in particular the sheet-metal shaped part, comprises a seating portion in the shape of a ring or ring portion, the external contour of which is preferably adapted to the internal contour of the valve housing. It is therefore possible for the insert in the fitted state to lie with its outer side fully against the inner wall of the valve housing. The seating portion may easily be formed by a curved sheet-metal strip, wherein the lateral leading edge of the sheet-metal strip is preferably supported on the inwardly protruding projection in the valve housing. The insert, in particular the sheet-metal shaped part, further comprises in particular a bearing portion having a preferably hook-shaped receiver for the lever. In this way, first the insert may be placed in the valve housing in a single operation by the fitter and then the lever may be hung on the preferably hook-shaped receiver. The bearing portion of the insert may moreover, as already described, comprise a further preferably hook-shaped receiver for a spring element. Such an insert may be realized in a particularly simple manner by a sheet-metal shaped part.

The previously described insert may comprise, in the case of a sheet-metal shaped part in particular on its lateral leading edge that is supported on the inner housing projection, at least one projection that interacts with a corresponding indentation in the valve housing, in particular in the inwardly protruding projection of the valve housing that forms the stop for the insert. In principle, the insert may also have an indentation at an appropriate point and the valve housing may have a corresponding projection at an appropriate point. Such a projection and such an indentation, which interact with one another, make it possible to align the insert, i.e. bring it into the precisely defined position, in the valve housing in a particularly simple manner. At the same time such a projection with a corresponding indentation represents an anti-rotation element that prevents an unintentional twisting of the insert, for example during screwing-on of a valve housing cover that simultaneously also forms the upper stop for the insert.

BRIEF DESCRIPTION OF THE DRAWINGS

There are many possible ways of configuring and developing the check valve according to the invention. In this respect, reference is made on the one hand to the claims that are following claim 1 and on the other hand to the description of embodiments in conjunction with the drawing. In the drawing:

FIG. 1a) shows in a perspective view a first embodiment of a lever 3.3, such as may be used in a flap module 3 of a check valve 1, such as is shown in FIGS. 6a) and 6b). The lever 3.3 is a sheet-metal shaped part 4, which has been manufactured by stamping or die bending. The mode of operation of the sheet-metal shaped part 4 will be described in greater detail below.

Figure 1A:
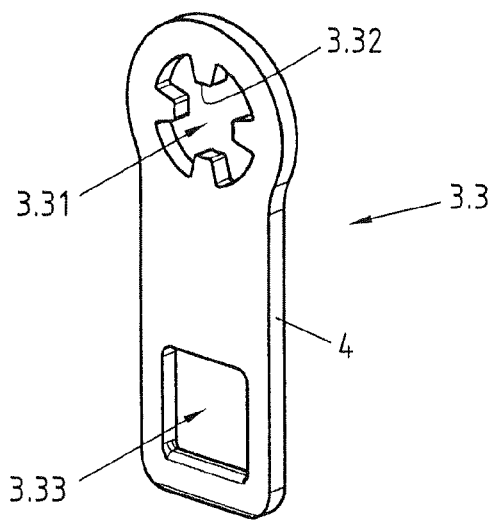
FIG. 1a) and b) show different embodiments of a lever for a check valve according to the invention, FIG. 2a) and b) show a perspective front- and rear view of an embodiment of a shut-off body for a check valve according to the invention, FIG. 3a) and b) show the shut-off body of FIG. 2a) and b) connected to the lever of FIG. 1a, FIG. 4a) and b) show the shut-off body of FIG. 2a) and b) connected to the lever of FIG. 1b), FIG. 5a) and b) show an embodiment of a bearing device for a check valve according to the invention, FIG. 6a) and b) show a first embodiment of a check valve according to the invention and FIG. 7a) and b) show a second embodiment of a check valve according to the invention.
Figure 1B:
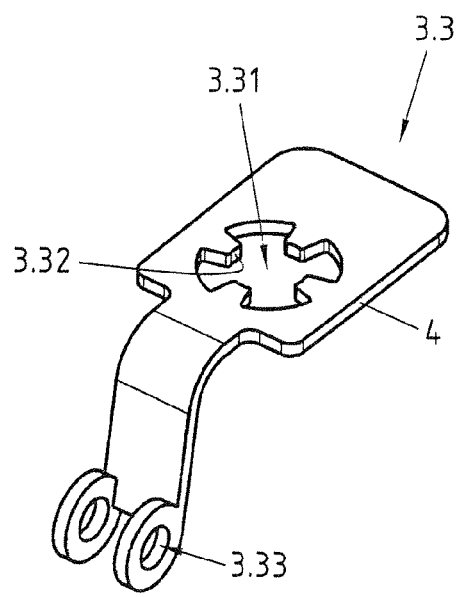
FIG. 1b) likewise shows a lever 3.3 that is formed by a sheet-metal shaped part 4. This lever 3.3 is used for operation in a flap module 3 of a check valve 1, such as will be further described with reference to FIG. 7a) and b). In this case the lever 3.3 is not a flat plate, as in FIG. 1a), but is L-shaped. In the case of FIG. 1b) the sheet-metal shaped part 4 has been manufactured likewise initially by stamping, wherein after stamping a bending operation was additionally carried out.
Figure 2A:
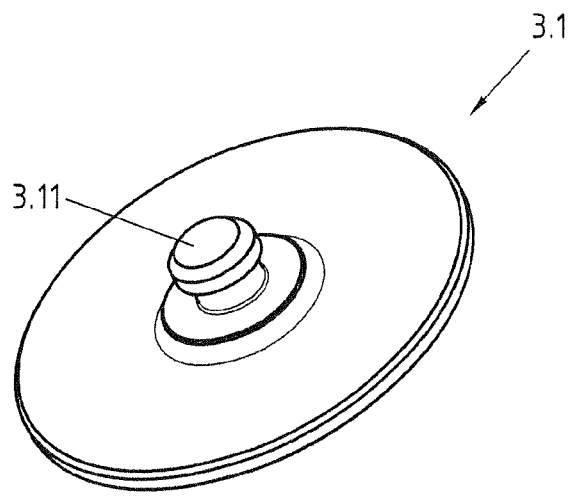
Figure 2B:
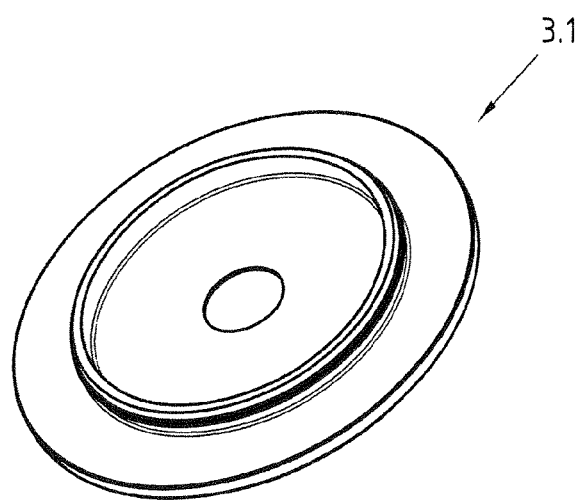

Both levers 3.3, that of FIG. 1a) and that of FIG. 1b), have a recess 3.31 that, as a result of material projections 3.32 oriented towards the centre of the recess 3.31, has substantially the shape of a 4-leaf clover. The recess 3.31 is used to latch with a counterpart 3.11, which is a component part of a shut-off body 3.1, such as is shown in FIG. 2a) and b). Such a shut-off body 3.1 has a rear side (FIG. 2a)), which in the mounted state faces the lever 3.3 and on which the said, here mushroom-shaped, counterpart 3.11 is formed. The other side of the shut-off body 3.1, which is represented in FIG. 2b), in the mounted state faces a valve seat 2.2 of a valve housing 2 of a check valve 1, such as is represented in FIGS. 6 and 7.

As a result of the material projections 3.32 there is achieved in this region of the recess 3.31 a specific elasticity and/or plasticity of the sheet-metal shaped part 4 that makes it possible to move the lever 3.3 over the mushroom-shaped counterpart 3.11, thereby producing a detent connection between the lever 3.3 and the shut-off body 3.1.

Figure 3A:
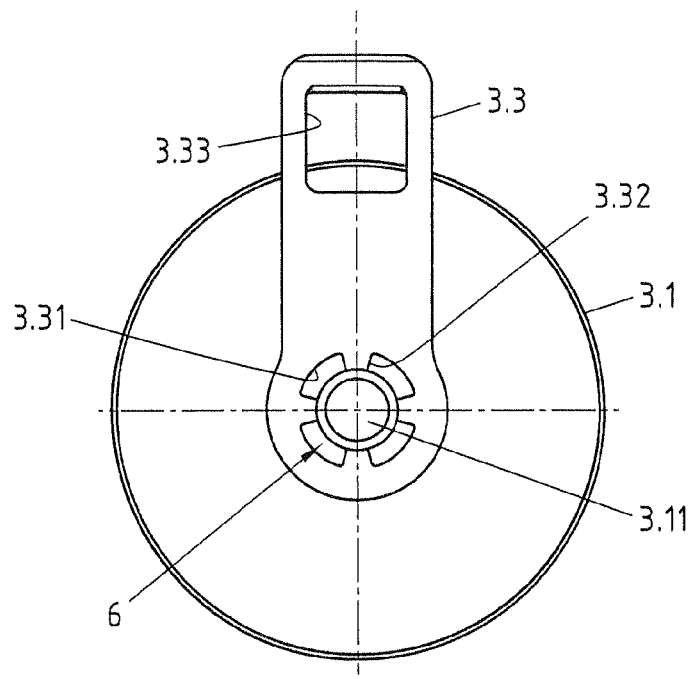
Figure 4A:
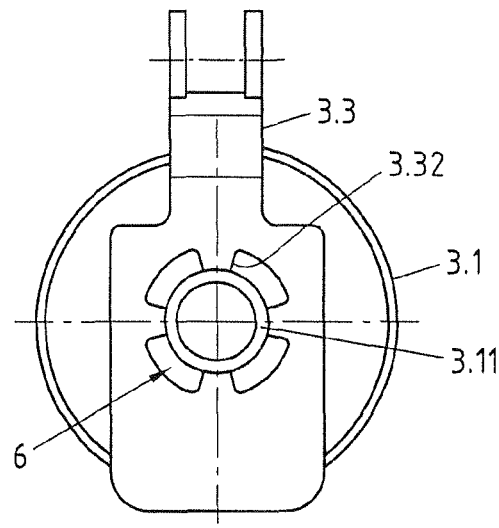
Figure 4B:
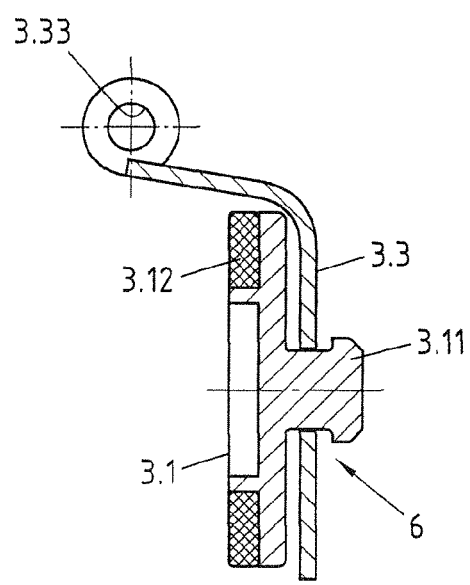

FIG. 3a) and b) show the latched state in the case of a lever 3.3 according to FIG. 1a). FIG. 4a) and b) show a correspondingly latched state in the case of a lever 3.3 according to FIG. 1b). In this case it may clearly be seen that in the latched state the shut-off body 3.1 is still movable to a specific extent relative to the lever 3.3. The detent connection therefore allows a specific play, so that the shut-off body 3.1 in the closed position always lies in an optimum manner against the valve seat 2.2 of the valve housing 2. This movable connection between shut-off body 3.1 and lever 3.3 is also promoted by the special shape of the recess 3.31.

Figure 3B:
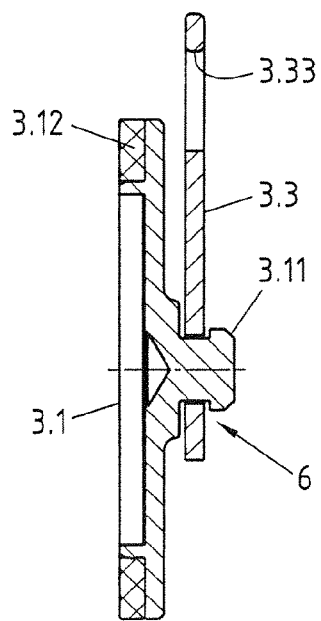

In order further to optimize the sealing action, the side of the shut-off body 3.1 facing the valve seat 2.2 additionally comprises in the mounted state an additional sealing ring 3.12 (FIG. 3b), 4b)).

Figure 5A:
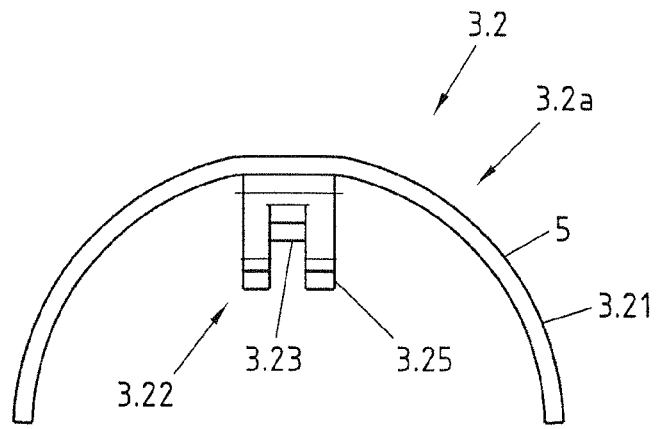
Figure 5B:
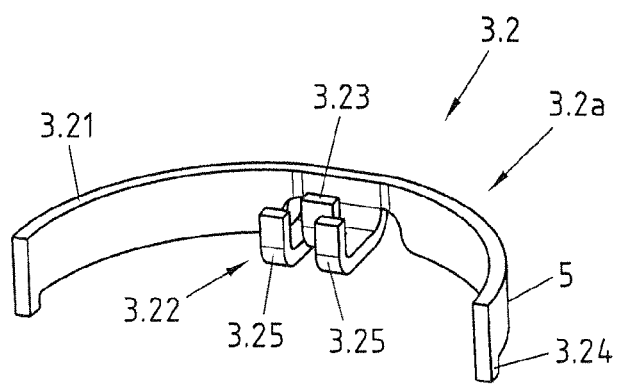

FIG. 5a) and b) additionally show a further sheet-metal shaped part 5, which forms an insert 3.2a that may be fitted as bearing device 3.2 in a flap module 3 of a check valve 1 as an alternative to a shaft 3.2b.

The insert 3.2a, which is not a shaft nor comprises a shaft, was manufactured likewise by stamping and subsequent bending. It is used to receive the entity of lever 3.3 and shut-off body 3.1 in the embodiment according to FIG. 3a) and b). The bearing device 3.2 or the insert 3.2a comprises a seating portion 3.21, which here has the shape of a ring portion and the external contour of which is adapted to the internal contour of the valve housing 2. At both ends the seating portion 3.21 has downwardly oriented projections 3.24, which facilitate the arrangement of the insert 3.2a in the valve housing 2 and serve as an anti-rotation element.

The insert 3.2a further comprises in the summit of the curved seating portion 3.21 a bearing portion 3.22 having a first receiver 3.23 and a second receiver 3.25. The first receiver 3.23 is formed by a central hook, which is set back relative to two further hooks, and the second receiver 3.25 is formed by the two further hooks, which extend parallel to one another. The hook-shaped receiver 3.23 is used to rotatably receive the lever 3.3 according to FIG. 1a) or the entity of lever 3.3 and shut-off body 3.1 according to FIG. 3a) and b). For this purpose, the lever 3.3 is inserted by means of a recess 3.33 into the hook-shaped receiver 3.23. A leg spring 3.4 may then be inserted in such a way into the second receiver 3.25 that the one leg rests against the lever 3.3 and the other leg rests against the valve housing cover 2.3, optionally under pressure, as is represented in FIG. 6a).

Figure 6A:
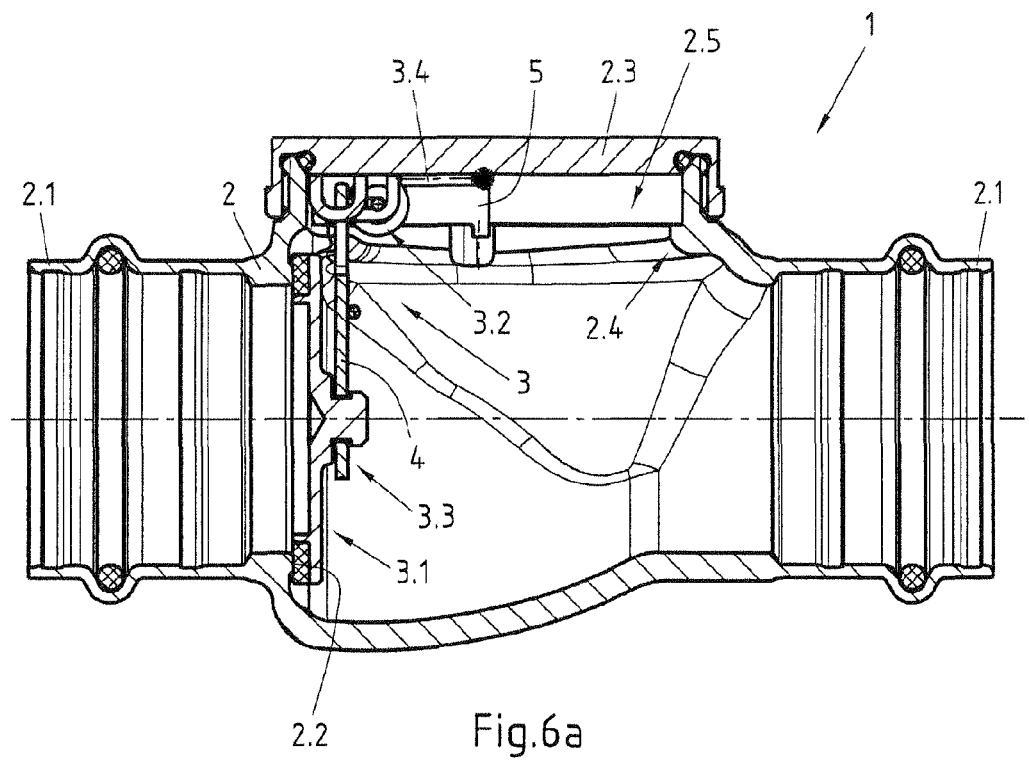

FIG. 6a) shows a check valve 1 for automatically blocking a fluid-carrying line (not represented) in the event of a reversal of the flow direction, containing a valve housing 2, which defines a flow path and has two connecting pieces 2.1 and a valve seat 2.2 disposed therebetween, and a flap module 3, which is mounted in the valve housing 2 and contains a shut-off body 3.1, such as is shown in FIG. 2a) and b), a bearing device 3.2, such as is shown in FIG. 5a) and b), and a lever 3.3, such as is shown in FIG. 1a).

The shut-off body 3.1, as stated, interacts with a valve seat 2.2 so that the shut-off body 3.1, here a circular or disk-shaped shut-off body, is movable between an open position, in which the flow path is cleared, and a closed position, in which the shut-off body 3.1 lies sealingly against the valve seat 2.2.

FIG. 6a) shows said closed position, in which the shut-off body 3.1 with the assistance of the leg spring 3.4 is held against the valve seat 2.2. The other leg of the spring 3.4 rests from below against the valve housing cover 2.3, which closes an inspection opening 2.5. The insert 3.2a forming the bearing device is in this case clamped tightly between the valve housing cover 2.3 serving as an upper stop and an inwardly protruding projection 2.4 serving as a lower stop.

The inspection opening 2.5 is disposed in such a way that, in order to manufacture the check valve or mount the flap module 3, first the insert 3.2a may be placed in the valve housing 2, then the lever 3.3, on which the shut-off body 3.1 is situated by means of a detent connection, may be hung onto the insert 3.2a at the corresponding receiver 3.23. Finally, the said leg spring 3.4 may be additionally inserted into the second receiver 3.25 of the insert 3.2a. Finally, the valve housing cover 2.3 is screwed onto the remaining valve housing 2, with the result that on the one hand the insert 3.2a is fixed and on the other hand the leg spring 3.4 is also placed under tension so that the spring 3.4 presses the shut-off body 3.1 against the valve seat 2.2.

Figure 6B:
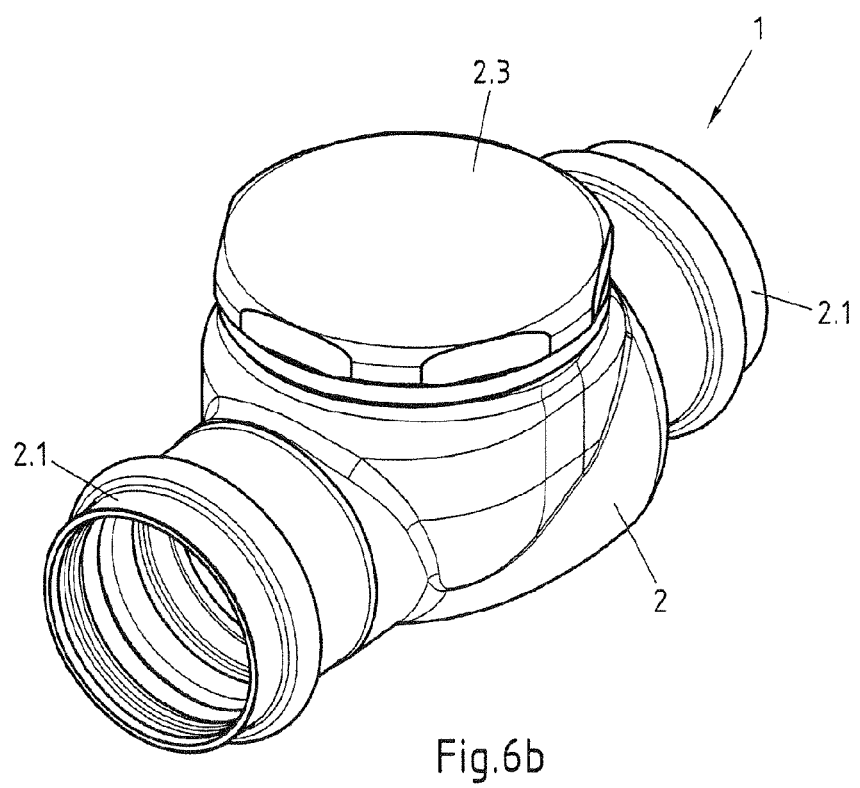

FIG. 6b) shows the check valve 1 of FIG. 6a) in a perspective view.

Figure 7A:
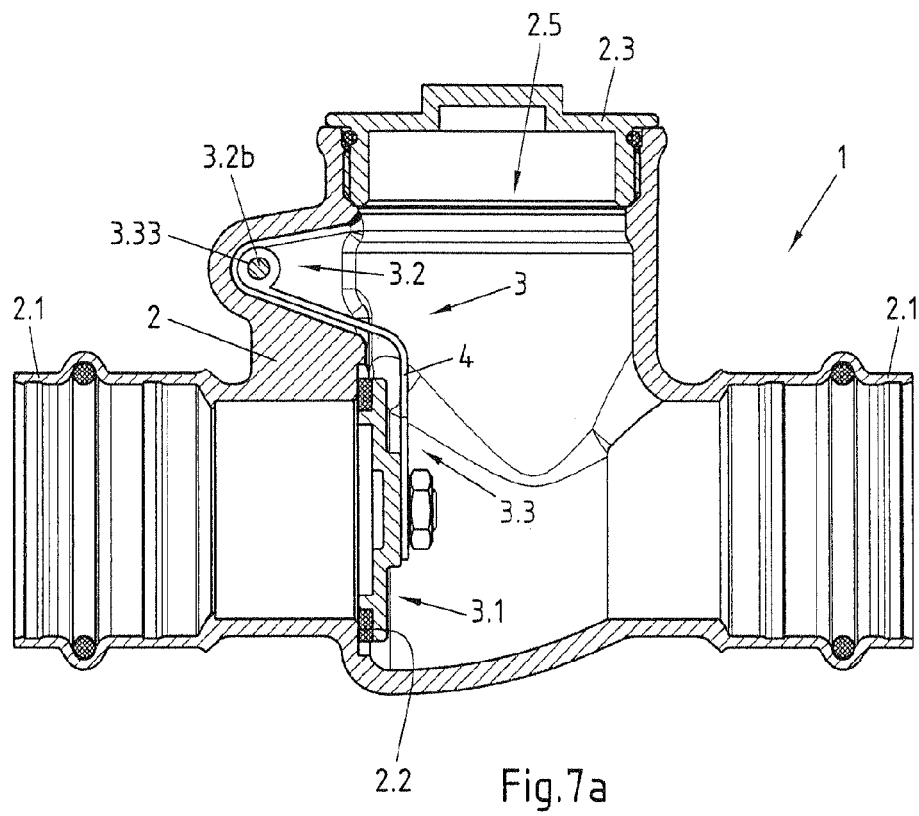
Figure 7B:
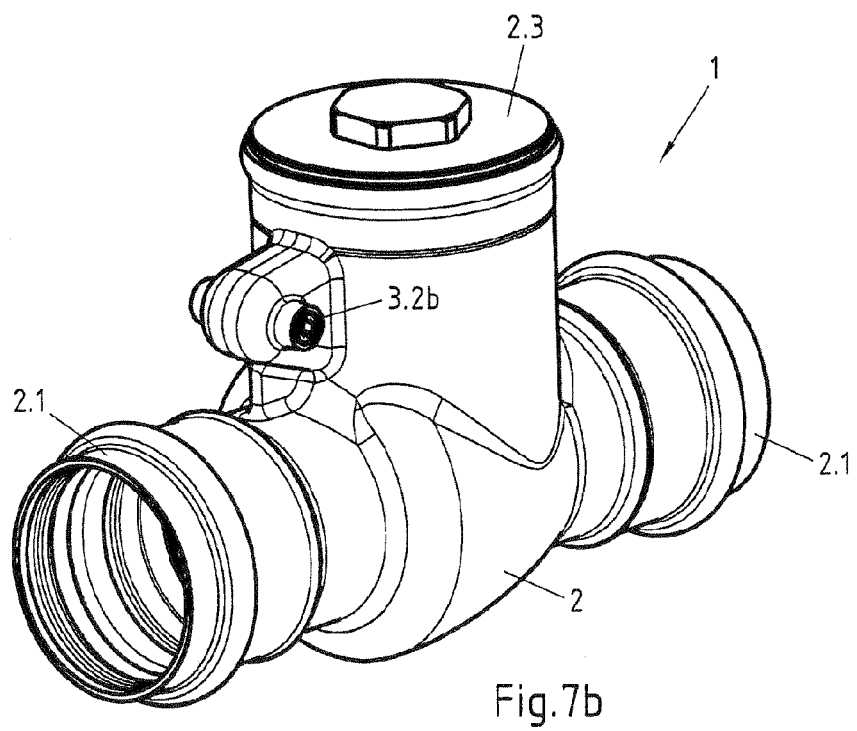

An alternative embodiment of a check valve 1 is represented in FIG. 7a) and b). FIG. 7a) shows a sectional view, FIG. 7b) a perspective view of the same check valve 1.

In this embodiment neither an insert 3.2a nor in particular a sheet-metal shaped part 5 but a shaft 3.2b is provided as bearing device 3.2, which extends through recesses 3.33 of a substantially L-shaped lever 3.3, such as is represented in FIG. 1b). In this case, by virtue of the selected geometry of the lever 3.3 in combination with the point of rotation an adequate closing force of the shut-off body 3.1 in closing position is already provided by gravitational force alone, so that it is possible to dispense with a spring 3.4, such as is provided in the embodiment in FIG. 6a) and b). In this case too, an inspection opening 2.5 is provided, which is closed by a valve housing cover 2.3.

As may be seen in FIG. 7a) and b), the lever 3.3 has two parallel recesses 3.33, which lie in each case in a plane that extends at right angles to the plane, in which lies the recess 3.31 that interacts in a latching manner with the counterpart 3.11 on the shut-off body 3.1. The shaft 3.2b is passed through these recesses 3.33 from the exterior of the housing. In this case, the lever 3.3 is rotatable about the shaft 3.2b, which forms a swiveling axis. In this way, the shut-off body 3.1 is moved between the closed position and the open position.

We claim:

1. Check valve for automatically blocking a fluid-carrying line in the event of a reversal of the flow direction, containing
   a valve housing, which defines a flow path and has two connecting pieces and a valve seat disposed therebetween, and
   a flap module, which is mounted in the valve housing and contains a shut-off body that interacts with the valve seat, a bearing device for pivotably supporting the shut-off body in the valve housing in such a way that the shut-off body is movable between an open position, in which the flow path is cleared, and a closed position, in which the shut-off body lies sealingly against the valve seat, and a lever, which extends between the shut-off body and the bearing device and is connected to the shut-off body and the bearing device,
   wherein at least one part of the flap module is formed by a sheet-metal shaped part,
   wherein the shut-off body comprises a detent element and the lever comprises a recess, the recess being used to latch with the detent element, such that the lever is connected by a detent connection detachably to the shut-off body, and
   wherein the shut-off body and the detent element are made in one part.

2. Check valve according to claim 1, wherein the lever is formed by a sheet-metal shaped part.

3. Check valve according to claim 1, wherein the shut-off body is movable fully out of the flow path in order to arrive in the open position.

4. Check valve according to claim 1, wherein the lever comprises a recess, which interacts in a latching manner with a counterpart on the shut-off body.

5. Check valve according to claim 4, wherein the lever comprises a recess, by which the lever is connected to the bearing device.

6. Check valve according to claim 1, wherein the bearing device is formed by a separate insert, which is fixed in the valve housing.

7. Check valve according to claim 6, wherein the insert is formed by a sheet-metal shaped part.

8. Check valve according to claim 6, wherein the valve housing comprises at least one inwardly protruding projection, on which the insert is supported.

9. Check valve according to claim 6, wherein the valve housing includes a valve housing cover, and wherein the insert is clamped in between the valve housing cover and the remaining valve housing.

10. Check valve according to claim 6, wherein the insert comprises a seating portion in the shape of a ring or ring portion.

11. Check valve according to claim 10, wherein the insert comprises at least one projection that interacts with a corresponding indentation in the valve housing.

12. Check valve according to claim 1, wherein the flap module comprises a mechanical spring element.

13. Check valve according to claim 12, wherein the valve housing comprises an inspection opening that is closed by a valve housing cover.

14. Check valve according to claim 13, wherein the bearing device includes an insert that is clamped in between the valve housing cover and the remaining valve housing.

15. Check valve for automatically blocking a fluid-carrying line in the event of a reversal of the flow direction, containing
   a valve housing, which defines a flow path and has two connecting pieces and a valve seat disposed therebetween, and
   a flap module, which is mounted in the valve housing and contains a shut-off body that interacts with the valve seat, a bearing device for pivotably supporting the shut-off body in the valve housing in such a way that the shut-off body is movable between an open position, in which the flow path is cleared, and a closed position, in which the shut-off body lies sealingly against the valve seat, and a lever, which extends between the shut-off body and the bearing device and is connected to the shut-off body and the bearing device,
   wherein the bearing device is formed by a separate insert that is fixed in the valve housing,
   wherein the shut-off body comprises a detent element and the lever comprises a recess, the recess being used to latch with the detent element, such that the lever is connected by a detent connection detachably to the shut-off body, and
   wherein the shut-off body and the detent element are made in one part.

16. Check valve according to claim 15, wherein the insert is formed by a sheet-metal shaped part.

17. Check valve according to claim 15, wherein the valve housing comprises at least one inwardly protruding projection, on which the insert is supported.

18. Check valve according to claim 15, wherein the insert comprises a seating portion in the form of a ring or ring portion.

19. Check valve according to claim 18, wherein the insert comprises at least one projection that interacts with a corresponding indentation in the valve housing.

* * * * *